(12) United States Patent
Doke et al.

(10) Patent No.: US 11,527,822 B2
(45) Date of Patent: Dec. 13, 2022

(54) ELECTROMAGNETIC WAVE TRANSMISSIVE COVER

(71) Applicant: TOYODA GOSEI CO., LTD., Kiyosu (JP)

(72) Inventors: Shinichi Doke, Kiyosu (JP); Eiji Kojima, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 38 days.

(21) Appl. No.: 17/354,641

(22) Filed: Jun. 22, 2021

(65) Prior Publication Data

US 2021/0408675 A1    Dec. 30, 2021

(30) Foreign Application Priority Data

Jun. 30, 2020  (JP) .............................. JP2020-112720

(51) Int. Cl.
| | |
|---|---|
| *H01Q 1/42* | (2006.01) |
| *G01S 7/03* | (2006.01) |
| *G01S 7/02* | (2006.01) |
| *G01S 13/931* | (2020.01) |

(52) U.S. Cl.
CPC ............ *H01Q 1/421* (2013.01); *G01S 7/027* (2021.05); *G01S 7/032* (2013.01); *G01S 13/931* (2013.01); *H01Q 1/42* (2013.01); *H01Q 1/422* (2013.01); *H01Q 1/425* (2013.01)

(58) Field of Classification Search
CPC .......... H01Q 1/421; H01Q 1/422; H01Q 1/42; H01Q 1/424; H01Q 1/425; H01Q 1/427; G01S 7/027; G01S 7/032; G01S 13/931
See application file for complete search history.

(56) References Cited

U.S. PATENT DOCUMENTS

| | | | | |
|---|---|---|---|---|
| 4,980,696 A | * | 12/1990 | Stone ..................... | H01Q 1/424 343/907 |
| 6,496,138 B1 | | 12/2002 | Honma | |
| 6,937,184 B2 | * | 8/2005 | Fujieda .................... | H01Q 1/42 342/198 |
| 8,287,990 B2 | * | 10/2012 | Maeda ..................... | G01S 7/03 427/58 |

(Continued)

FOREIGN PATENT DOCUMENTS

JP              3419675 B2     6/2003

*Primary Examiner* — Vibol Tan
(74) *Attorney, Agent, or Firm* — Posz Law Group, PLC

(57) ABSTRACT

An electromagnetic wave transmissive cover includes: a base made of a dielectric material and having transmissiveness to electromagnetic waves; and a reflection hindering layer laminated on at least one of two surfaces of the base in a travel direction of the electromagnetic waves, made of a dielectric material, having transmissiveness to the electromagnetic waves, and hindering reflection of the electromagnetic waves. A wavelength of each electromagnetic wave in the reflection hindering layer is referred to as $\lambda_2$ and $2\pi/\lambda_2$ is set as a phase constant $\beta_2$. An amount of deviation between a phase of a reflected wave reflected on the front interface of the reflection hindering layer in the travel direction and a phase of a reflected wave reflected on the rear interface is referred to as a phase deviation amount $\beta$. Thickness $L_2$ of the reflection hindering layer is set to $\beta/\beta_2$.

3 Claims, 4 Drawing Sheets

(56) References Cited

U.S. PATENT DOCUMENTS

| | | | |
|---|---|---|---|
| 10,135,131 B2* | 11/2018 | Takao | H01Q 1/42 |
| 10,218,048 B2* | 2/2019 | Miyoshi | G01S 13/931 |
| 2014/0091969 A1* | 4/2014 | Shi | G01S 13/02 |
| | | | 342/385 |
| 2016/0248152 A1* | 8/2016 | Takao | H01Q 1/3291 |
| 2021/0063530 A1* | 3/2021 | Doke | H01Q 15/0026 |

* cited by examiner

ELECTROMAGNETIC WAVE TRANSMISSIVE COVER

BACKGROUND

1. Field

The present disclosure relates to an electromagnetic wave transmissive cover arranged in a path of electromagnetic waves transmitted and received by a radar device.

2. Description of Related Art

In vehicles equipped with a radar device (such as a millimeter wave radar device), the radar device transmits electromagnetic waves (such as millimeter waves) toward the outside of the vehicle. The electromagnetic waves that have struck and have been reflected by an object outside the vehicle including, for example, a leading vehicle and pedestrians are received by the radar device. Using the transmitted and received electromagnetic waves, the radar device recognizes the object and detects, for example, the distance between the vehicle and the object and the relative speed.

When seen from the outside of the vehicle, the radar device lowers the aesthetic appearance of the vehicle. Thus, the radar device needs to be difficult to see from the outside of the vehicle. However, when the radar device is arranged on the inner side of a conventional exterior component for the vehicle (such as a front grille or a bumper), the exterior component interferes with the electromagnetic waves from the radar device.

One solution is to make the above-described exterior component transmissive to electromagnetic waves. Japanese Patent No. 3419675 discloses an example in which a radar device is arranged on the inner side of the bumper of the vehicle. The bumper includes a radome having transmissiveness to electromagnetic waves. The radome is located at a portion of the bumper serving as an electromagnetic wave path.

Another possible solution is a technique of arranging the opening at a portion of the front grille serving as a path of electromagnetic waves from the radar device so that the opening includes a cover (electromagnetic wave transmissive cover) through which electromagnetic waves pass.

Furthermore, in the above-described document, paint made of a material through which electromagnetic waves pass is used to perform anti-reflective coating for the bumper.

When the above-described radome and electromagnetic wave transmissive cover are irradiated with electromagnetic waves, some of the electromagnetic waves are reflected. The reflection lowers the amount of electromagnetic waves passing through and lowers the detection performance of the radar device. This increases the importance of a method of reducing the amount of electromagnetic waves that are reflected.

However, the anti-reflective coating disclosed in the above-described document is a technique of keeping the bumper transmissive to electromagnetic waves by preventing the occurrence of reflection that results from the coating, not a technique of hindering the reflection of electromagnetic waves in the bumper.

SUMMARY

It is an objective of the present disclosure to provide an electromagnetic wave transmissive cover that improves the transmissiveness to electromagnetic waves by hindering the reflection of electromagnetic waves.

An electromagnetic wave transmissive cover that solves the above-described problem includes: a base configured to be arranged in a path of electromagnetic waves in a radar device that transmits and receives the electromagnetic waves, the base being made of a dielectric material and having transmissiveness to the electromagnetic waves: and a reflection hindering layer laminated on at least one of two surfaces of the base in a travel direction of the electromagnetic waves, the reflection hindering layer being made of a dielectric material, the reflection hindering layer having transmissiveness to the electromagnetic waves and hindering reflection of the electromagnetic waves. A wavelength of each of the electromagnetic waves in the reflection hindering layer is referred to as $\lambda 2$ and $2\pi/\lambda 2$ is set as a phase constant $\beta_2$. An amount of deviation between a phase of a reflected wave reflected on an interface on a front side of the reflection hindering layer in the travel direction and a phase of a reflected wave reflected on an interface on a rear side of the reflection hindering layer in the travel direction is referred to as a phase deviation amount $\beta$. Thickness $L_2$ of the reflection hindering layer is set to $\beta/\beta_2$.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An electromagnetic wave transmissive cover applied to an emblem 15 for a vehicle 10 according to an embodiment will now be described with reference to the drawings.

Figure 1:
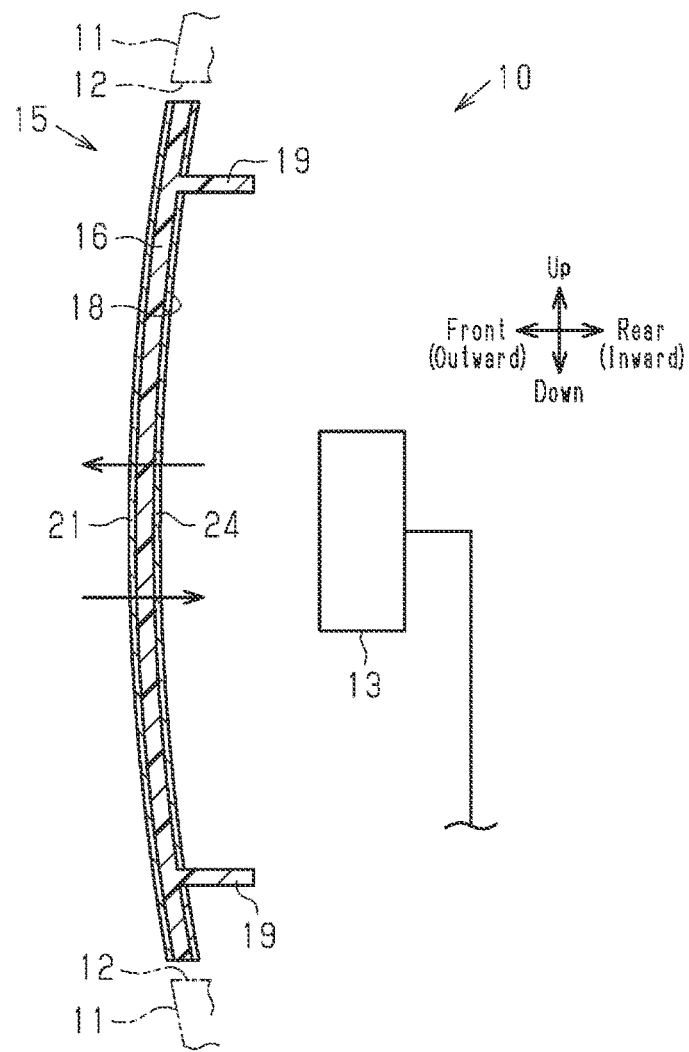
FIG. 1 is a schematic cross-sectional view of an electromagnetic wave transmissive cover applied to a vehicle emblem according to an embodiment, showing the emblem with a part of a front grille that includes a window.

In the following description, the direction in which the vehicle 10 travels frontward will be referred to as the front, and the rearward direction will be referred to as the rear. The up-down direction refers to the up-down direction of the vehicle 10. In FIG. 1, the dimensions of components of the emblem are changed such that the components are recognizable.

As shown in FIG. 1, the vehicle 10 includes a front-monitoring millimeter wave radar device 13. The millimeter wave radar device 13 is located at the rear of a front grille 11 in the middle of the front part of the vehicle 10 in the width direction. The millimeter wave radar device 13 is configured to transmit millimeter waves in electromagnetic waves toward the front and receive the millimeter waves that have struck and have been reflected by an object outside the vehicle 10. Millimeter waves are radio waves with wavelengths of 1 mm to 10 mm and frequencies of 30 GHz to 300 GHz.

In the same manner as a general front grille, the thickness of the front grille 11 is not fixed. In the front grille 11, a metal plating layer may be formed on the outer surface of a plastic base. Thus, the front grille 11 interferes with the millimeter waves that have been transmitted or reflected. Accordingly, the front grille 11 includes a window 12 at the front of the millimeter wave radar device 13 in the direction in which the millimeter waves are transmitted.

The emblem 15 of the present embodiment is arranged at the window 12. In the description of the emblem 15, the side of the ornamental surface of the emblem 15 (the left side in FIG. 1) is referred to as an outer side, and the side opposite to the ornamental surface (the right side in FIG. 1) is referred to as an inner side.

The emblem 15 is arranged upright such that its outer surface (ornamental surface) is directed toward the front of the vehicle 10 and its inner surface is directed toward the rear of the vehicle 10. In this arrangement, the outer side of the emblem 15 corresponds to the front side of the vehicle 10 and the inner side of the emblem 15 corresponds to the rear side of the vehicle 10.

Thus, in the description of the emblem 15, the terms "outer" and "inner" are used to specify the direction corresponding to the front-rear direction of the vehicle 10.

The emblem 15 of the present embodiment includes a three-layer structure including a base 16 and two reflection hindering layers 21, 24. The reflection hindering layers 21, 24 are located on opposite sides of the base 16. The base 16 is made of a dielectric material and has transmissiveness to millimeter waves. More specifically, the base 16 has the shape of a plate and is made of a material (such as plastic material) having transmissiveness to millimeter waves and having a known relative permittivity. The plastic material used to form the base 16 may be transparent or opaque. To facilitate understanding, the base 16 consists of a single layer in this example. Instead, the base 16 may consist of two or more layers.

Figure 2:
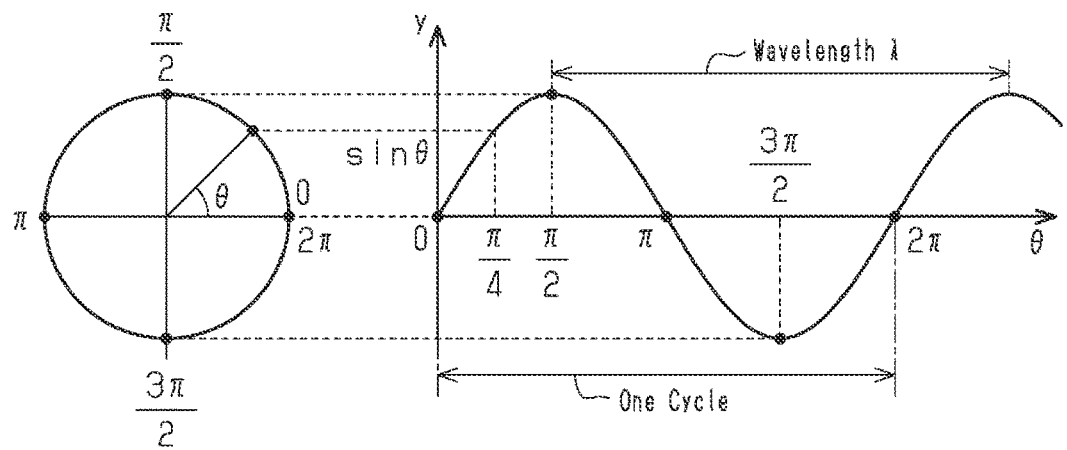
FIG. 2 is a diagram illustrating the relationship between a unit circle and the waveform of a millimeter wave in the embodiment.
Figure 4:
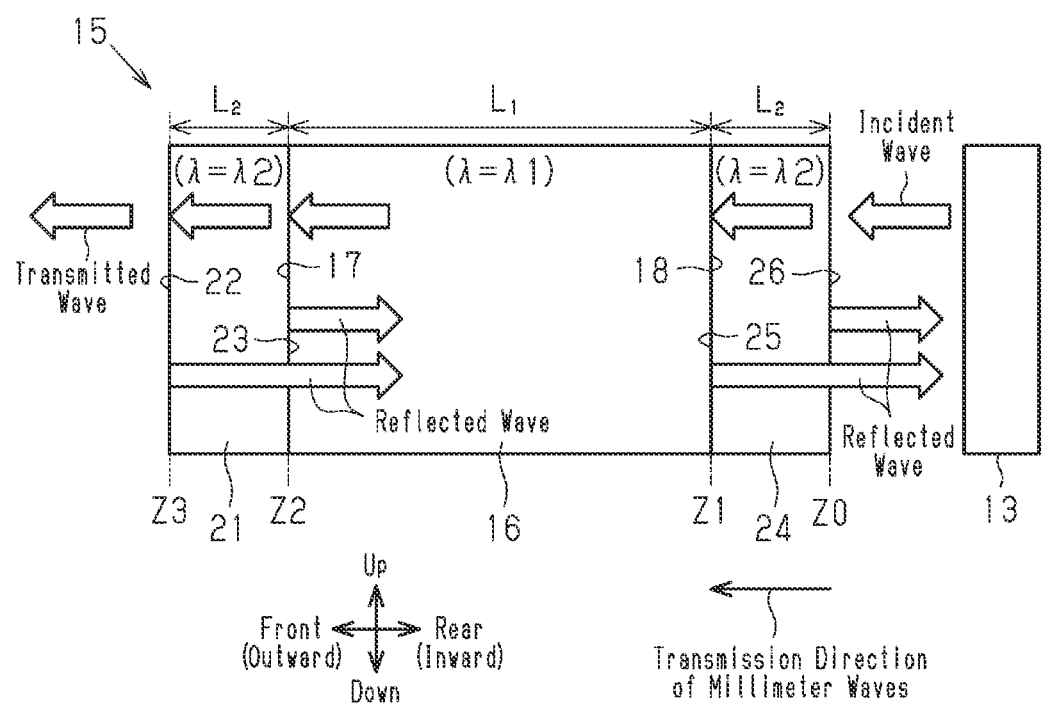
FIG. 4 is a diagram illustrating an operation in which the reflected waves are offset by the reflection hindering layers in the embodiment.

FIG. 2 shows the relationship between a unit circle and the waveform of a millimeter wave represented by graph $y = \sin \theta$. The value of y in this graph varies depending on the value of angle $\theta$. As shown in FIGS. 2 and 4, the thickness of the base 16 is referred to as $L_1$, the wavelength of the millimeter wave in the base 16 is referred to as $\lambda 1$, and $2\pi/\lambda 1$ is set as a phase constant $\beta_1$. The base 16 is formed such that thickness $L_1$ is uniform in a millimeter wave transmissive region.

Figure 5:
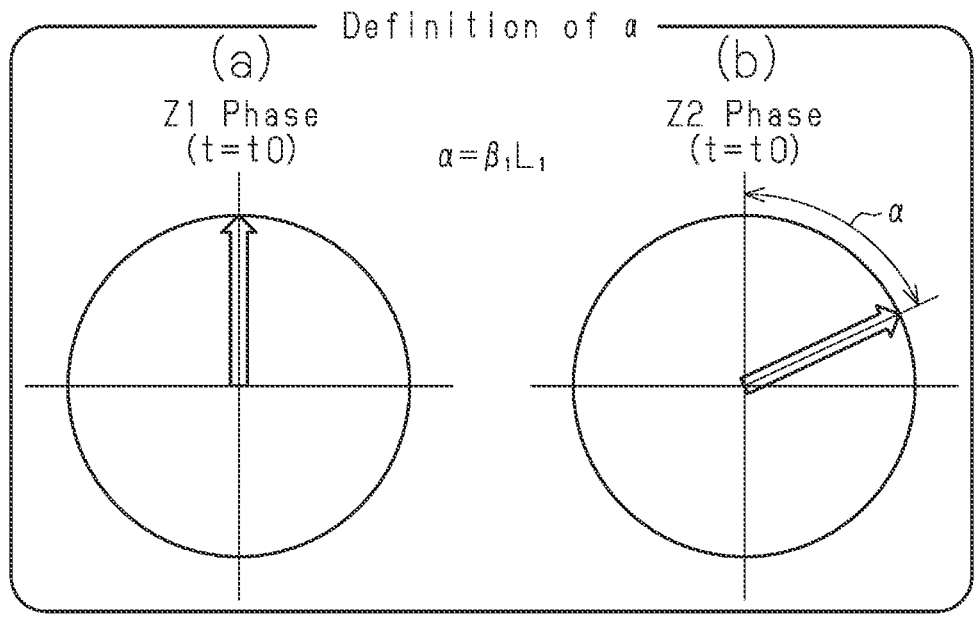
FIG. 5 is a diagram illustrating a phase deviation amount $\alpha$ of the reflected wave in the base of the embodiment.

As shown in FIG. 4 and sections (a), (b) in FIG. 5, the coordinate in the millimeter wave travel direction (transmission direction in FIG. 4) is referred to as Z. The coordinate of an inner surface 18 of the base 16 in the millimeter wave travel direction is referred to as Z1, and the coordinate of an outer surface 17 of the base 16 is referred to as Z2. Referring to FIG. 4 and section (a) in FIG. 5, the phase obtained when the millimeter wave is reflected on the inner surface 18 (coordinate Z1) of the base 16 at timing t0 is referred to as the Z1 phase of the reflected wave. Referring to FIG. 4 and section (b) in FIG. 5, the phase obtained when the millimeter wave is reflected on the outer surface 17 (coordinate Z2) of the base 16 at the same timing t0 is referred to as the Z2 phase of the reflected wave. The amount of deviation between the Z2 phase and the Z1 phase is referred to as a phase deviation amount $\alpha$. The phase deviation amount $\alpha$ is expressed by Equation 1.

$$\alpha = \beta_1 L_1 \qquad \text{Equation 1}$$

As shown in FIG. 1, attachment portions 19 are arranged at multiple positions of the periphery of the inner surface 18 of the base 16. The attachment portions 19 are used to couple the emblem 15 to the front grille 11 or the vehicle body. The attachment portions 19 include, for example, clips, screws, and engagement tabs.

As shown in FIG. 4, the reflection hindering layer 21 on the outer side of the base 16 is laminated on the outer surface 17 of the base 16. The reflection hindering layer 24 on the inner side of the base 16 is laminated on the inner surface 18 of the base 16. The surfaces subject to this lamination include a region irradiated with millimeter waves. The reflection hindering layers 21, 24 are made of a dielectric material and have transmissiveness to millimeter waves. More specifically, reflection hindering layers 21, 24 are made of a material (such as plastic material) having transmissiveness to millimeter waves and having a known relative permittivity. The plastic material used to form the reflection hindering layers 21, 24 may be transparent or opaque.

The reflection hindering layers 21, 24 may have the shape of a sheet. In this case, the reflection hindering layer 21 is bonded to the outer surface 17 of the base 16 and the reflection hindering layer 24 is bonded to the inner surface 18 of the base 16. Further, the reflection hindering layers 21, 24 may be formed so as to be laminated on the base 16 through plastic molding instead of the bonding.

Figure 6:
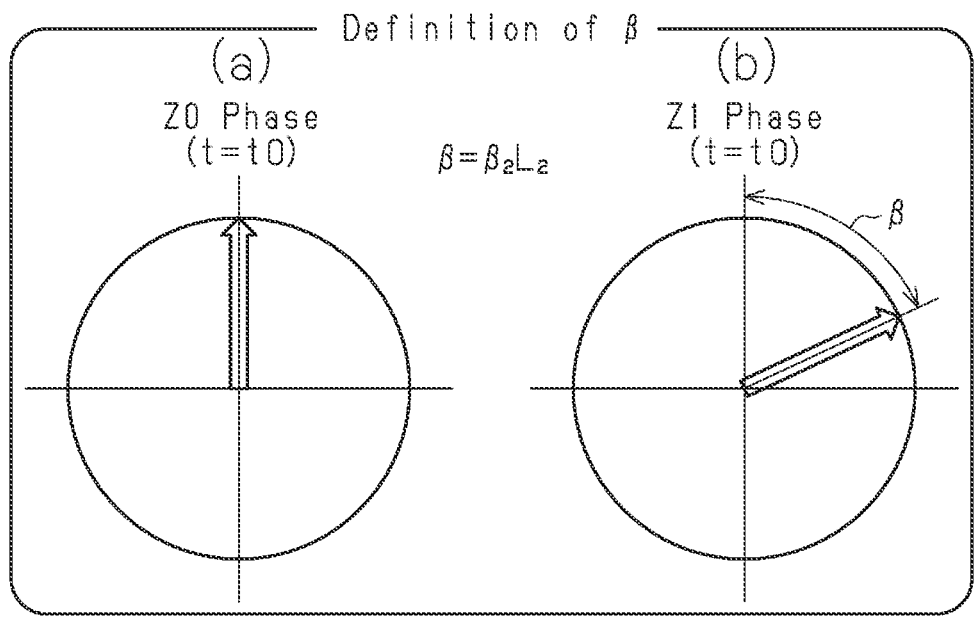
FIG. 6 is a diagram illustrating a phase deviation amount 1 of the reflected wave in the reflection hindering layer of the embodiment.

As shown in FIG. 4 and sections (a), (b) in FIG. 6, the thickness of each of the reflection hindering layers 21, 24 is referred to as $L_2$, the wavelength of the millimeter wave in the reflection hindering layers 21, 24 is referred to as λ2, and 2π/λ2 is set as a phase constant $\beta_2$. The reflection hindering layers 21, 24 have the same thickness $L_2$. The coordinate of an inner surface 26 of the reflection hindering layer 24 in the millimeter wave travel direction is referred to as Z0. The coordinate of an outer surface 25 of the reflection hindering layer 24 is the same as the coordinate (Z1) of the inner surface 18 of the base 16.

Referring to FIG. 4 and section (a) in FIG. 6, the phase obtained when the millimeter wave is reflected on the inner surface 26 (coordinate Z0) of the reflection hindering layer 24 at timing t0 is referred to as the Z0 phase of the reflected wave. Referring to FIG. 4 and section (b) in FIG. 6, the phase obtained when the millimeter wave is reflected on the outer surface 25 (coordinate Z1) of the reflection hindering layer 24 at the same timing t0 is referred to as the Z1 phase of the reflected wave. The amount of deviation between the Z1 phase and the Z0 phase is referred to as a phase deviation amount D.

The coordinate of an outer surface 22 of the reflection hindering layer 21 is referred to as Z3. The coordinate of an inner surface 23 of the reflection hindering layer 21 is the same as the coordinate (Z2) of the outer surface 17 of the base 16.

Although not illustrated in the drawings, the phase obtained when the millimeter wave is reflected on the inner surface 23 (coordinate Z2) of the reflection hindering layer 21 at the timing to is referred to as the Z2 phase of the reflected wave. Further, the phase obtained when the millimeter wave is reflected on the outer surface 22 (coordinate Z3) of the reflection hindering layer 21 at the same timing t0 is referred to as the Z3 phase of the reflected wave. Since the reflection hindering layers 21, 24 have the same thickness $L_2$ and the same relative permittivity, the amount of deviation between the Z3 phase and the Z2 phase is the same as the phase deviation amount β (refer to section (b) in FIG. 6).

The phase deviation amount β of the reflection hindering layers 21, 24 is expressed by Equation 2.

$$\beta = \tan^{-1} \frac{-A \pm \sqrt{A^2 - 4BC}}{2C} + n\pi = \beta_2 L_2 \qquad \text{Equation 2}$$

In Equation 2, the letter "A" is expressed by Equation 3, the letter "B" is expressed by Equation 4, and the letter "C" is expressed by Equation 5. In Equations 3 to 5, $\varepsilon_\alpha$ refers to the relative permittivity of the base 16, and sp refers to the relative permittivity of each of the reflection hindering layers 21, 24.

$$A = 2\left(\frac{1}{\sqrt{\varepsilon_\beta}} - \sqrt{\varepsilon_\beta}\right)\cos\alpha \qquad \text{Equation 3}$$

$$B = \left(\frac{1}{\sqrt{\varepsilon_\alpha}} - \sqrt{\varepsilon_\alpha}\right)\sin\alpha \qquad \text{Equation 4}$$

$$C = \left(\frac{\varepsilon_\beta}{\sqrt{\varepsilon_\alpha}} - \frac{\sqrt{\varepsilon_\alpha}}{\varepsilon_\beta}\right)\sin\alpha \qquad \text{Equation 5}$$

From Equation 2, thickness $L_2$ of the reflection hindering layers 21, 24 is expressed by Equation 6. In Equation 6, λ refers to the wavelength in a vacuum.

$$L_2 = \frac{\beta}{\beta_2} = \beta \times \frac{\lambda 2}{2\pi} = \beta \times \frac{\lambda}{2\pi\sqrt{\varepsilon_\beta}} \qquad \text{Equation 6}$$

Equations 2 to 6 are obtained as follows.

F matrices in which the reflection hindering layers 21, 24 and the base 16 are combined are expressed by the following Equations 7 to 11 by connecting, in a cascade, the F matrices indicating these members. In Equations 7 to 11, the letter "j" is an imaginary unit and $Z_0$ is a characteristic impedance in a vacuum.

$$F = \begin{bmatrix} \cos\beta & j\frac{Z_0}{\sqrt{\varepsilon_\beta}}\sin\beta \\ j\frac{\sqrt{\varepsilon_\beta}\sin\beta}{Z_0} & \cos\beta \end{bmatrix} \begin{bmatrix} \cos\alpha & j\frac{Z_0}{\sqrt{\varepsilon_\alpha}}\sin\alpha \\ j\frac{\sqrt{\varepsilon_\alpha}\sin\alpha}{Z_0} & \cos\alpha \end{bmatrix} \begin{bmatrix} \cos\beta & j\frac{Z_0}{\sqrt{\varepsilon_\beta}}\sin\beta \\ j\frac{\sqrt{\varepsilon_\beta}\sin\beta}{Z_0} & \cos\beta \end{bmatrix} = \qquad \text{Equation 7}$$

$$\begin{bmatrix} \cos\alpha\cos\beta - \frac{\sqrt{\varepsilon_\alpha}}{\sqrt{\varepsilon_\beta}}\sin\alpha\sin\beta & jZ_0\left(\frac{1}{\sqrt{\varepsilon_\beta}}\cos\alpha\sin\beta + \frac{1}{\sqrt{\varepsilon_\alpha}}\sin\alpha\cos\beta\right) \\ j\frac{\sqrt{\varepsilon_\alpha}\sin\alpha\cos\beta + \sqrt{\varepsilon_\beta}\cos\alpha\sin\beta}{Z_0} & -\frac{\sqrt{\varepsilon_\beta}}{\sqrt{\varepsilon_\alpha}}\sin\alpha\sin\beta + \cos\alpha\cos\beta \end{bmatrix} \begin{bmatrix} \cos\beta & j\frac{Z_0}{\sqrt{\varepsilon_\beta}}\sin\beta \\ j\frac{\sqrt{\varepsilon_\beta}\sin\beta}{Z_0} & \cos\beta \end{bmatrix} = \begin{bmatrix} A & B \\ C & D \end{bmatrix}$$

$$A = \cos\alpha\cos^2\beta - \frac{\sqrt{\varepsilon_\alpha}}{\sqrt{\varepsilon_\beta}}\sin\alpha\sin\beta\cos\beta - \left(\cos\alpha\sin^2\beta + \frac{\sqrt{\varepsilon_\beta}}{\sqrt{\varepsilon_\alpha}}\sin\alpha\sin\beta\cos\beta\right) \qquad \text{Equation 8}$$

$$B = jZ_0\left(\frac{1}{\sqrt{\varepsilon_\beta}}\cos\alpha\cos\beta\sin\beta - \frac{\sqrt{\varepsilon_\alpha}}{\varepsilon_\beta}\sin\alpha\sin^2\beta + \frac{1}{\sqrt{\varepsilon_\beta}}\cos\alpha\cos\beta\sin\beta + \frac{1}{\sqrt{\varepsilon_\alpha}}\sin\alpha\cos^2\beta\right) \qquad \text{Equation 9}$$

$$C = j\frac{\sqrt{\varepsilon_\alpha}\sin\alpha\cos^2\beta + \sqrt{\varepsilon_\beta}\cos\alpha\cos\beta\sin\beta}{Z_0} + j\frac{-\frac{\varepsilon_\beta}{\sqrt{\varepsilon_\alpha}}\sin\alpha\sin^2\beta + \sqrt{\varepsilon_\beta}\cos\alpha\cos\beta\sin\beta}{Z_0} \qquad \text{Equation 10}$$

$$D = -\frac{\sqrt{\varepsilon_\alpha}}{\sqrt{\varepsilon_\beta}}\sin\alpha\sin\beta\cos\beta - \cos\alpha\sin^2\beta - \frac{\sqrt{\varepsilon_\beta}}{\sqrt{\varepsilon_\alpha}}\sin\alpha\sin\beta\cos\beta + \cos\alpha\cos^2\beta \qquad \text{Equation 11}$$

From the F matrices, a reflection coefficient R is calculated by Equation 12. The reflection coefficient R represents the degree of reflection occurring in an interface (the ratio of reflected wave to incident wave; refer to FIG. 4). The reflection coefficient R is 0 when no reflection occurs.

$$R = \frac{A + \dfrac{B}{Z_0} - Z_0 C - D}{A + \dfrac{B}{Z_0} + Z_0 C + D} \qquad \text{Equation 12}$$

All of the millimeter waves pass through (completely pass through) the emblem 15 on the condition that the reflection coefficient R is 0, and thus the value of the numerator in Equation 12 simply needs to be 0. By substituting the values of the F matrices into the expression of the numerator in Equation 12 and organizing these values, the following Equation 13 is obtained.

$$A + \frac{B}{Z_0} - Z_0 C - D = \qquad \text{Equation 13}$$

$$\cos\alpha\cos^2\beta - \frac{\sqrt{\varepsilon_\alpha}}{\sqrt{\varepsilon_\beta}}\sin\alpha\sin\beta\cos\beta - \left(\cos\alpha\sin^2\beta + \frac{\sqrt{\varepsilon_\beta}}{\sqrt{\varepsilon_\alpha}}\sin\alpha\sin\beta\cos\beta\right) +$$

$$j\left(\frac{1}{\sqrt{\varepsilon_\beta}}\cos\alpha\cos\beta\sin\beta - \frac{\sqrt{\varepsilon_\alpha}}{\varepsilon_\beta}\sin\alpha\sin^2\beta + \right.$$

$$\left. \frac{1}{\sqrt{\varepsilon_\beta}}\cos\alpha\cos\beta\sin\beta + \frac{1}{\sqrt{\varepsilon_\alpha}}\sin\alpha\cos^2\beta\right) - j\left(\sqrt{\varepsilon_\alpha}\sin\alpha\cos^2\beta + \right.$$

$$\left. \sqrt{\varepsilon_\beta}\cos\alpha\cos\beta\sin\beta - \frac{\varepsilon_\beta}{\sqrt{\varepsilon_\alpha}}\sin\alpha\sin^2\beta + \sqrt{\varepsilon_\beta}\cos\alpha\cos\beta\sin\beta\right) +$$

$$\frac{\sqrt{\varepsilon_\alpha}}{\sqrt{\alpha_\beta}}\sin\alpha\sin\beta\cos\beta + \cos\alpha\cos^2\beta + \frac{\sqrt{\varepsilon_\beta}}{\sqrt{\varepsilon_\alpha}}\sin\alpha\sin\beta\cos\beta - \cos\alpha\cos^2\beta =$$

$$j\left\{2\left(\frac{1}{\sqrt{\varepsilon_\beta}} - \sqrt{\varepsilon_\beta}\right)\cos\alpha\cos\beta\sin\beta + \right.$$

$$\left. \left(\frac{1}{\sqrt{\varepsilon_\alpha}} - \sqrt{\varepsilon_\alpha}\right)\sin\alpha\cos^2\beta + \left(\frac{\varepsilon_\beta}{\sqrt{\varepsilon_\alpha}} - \frac{\sqrt{\varepsilon_\alpha}}{\varepsilon_\beta}\right)\sin\alpha\sin^2\beta\right\}$$

From Equation 13, the condition that the numerator becomes 0 is expressed by the following Equation 14.

$$2\left(\frac{1}{\sqrt{\varepsilon_\beta}} - \sqrt{\varepsilon_\beta}\right)\cos\alpha\cos\beta\sin\beta + \qquad \text{Equation 14}$$

$$\left(\frac{1}{\sqrt{\varepsilon_\alpha}} - \sqrt{\varepsilon_\alpha}\right)\sin\alpha\cos^2\beta + \left(\frac{\varepsilon_\beta}{\sqrt{\varepsilon_\alpha}} - \frac{\sqrt{\varepsilon_\alpha}}{\varepsilon_\beta}\right)\sin\alpha\sin^2\beta = 0$$

In Equation 14, the phase deviation amount α and the relative permittivities $\varepsilon_\alpha$, $\varepsilon_\beta$ are known. The only variable in Equation 14 is the phase deviation amount β. By organizing Equation 14 in terms of the phase deviation amount β, Equation 15 is obtained. By dividing the terms in Equation 15 by $\cos^2\beta$, Equation 16 is obtained. Where tan β=x, Equation 16 is expressed by Equation 17, which represents a quadratic function, and x is represented by Equation 18. From Equation 18, the above-described Equations 1 and 6 are obtained.

$$A\cos\beta\sin\beta + B\cos^2\beta + C\sin^2\beta = 0 \qquad \text{Equation 15}$$

$$A\tan\beta + B + C\tan^2\beta = 0 \qquad \text{Equation 16}$$

$$Cx^2 + Ax + B = 0 \qquad \text{Equation 17}$$

$$x = \frac{-A \pm \sqrt{A^2 - 4BC}}{2C} \qquad \text{Equation 18}$$

Accordingly, as shown in FIG. 1, the emblem 15 is arranged upright in the window 12 and attached to the front grille 11 or the vehicle body at the attachment portions 19.

The operation of the present embodiment will now be described. The advantages resulting from the operation will also be described.

When millimeter waves are transmitted from the millimeter wave radar device 13 in FIGS. 1 and 4, some of the millimeter waves pass through the parts of the emblem 15 in the millimeter wave transmissive region. After the millimeter waves that have passed through strike and are reflected by an object at the front of the vehicle including, for example, the leading vehicle and pedestrian, the millimeter waves pass through the millimeter wave transmissive region of the emblem 15 again and are received by the millimeter wave radar device 13. Using the transmitted and received millimeter waves, the millimeter wave radar device 13 recognizes the object and detects, for example, the distance between the vehicle 10 and the object and the relative speed.

Some of the millimeter waves (incident waves) that have been transmitted from the millimeter wave radar device 13 and have entered the emblem 15 are reflected on the interface of the parts of the emblem 15. The emblem 15 of the present embodiment has a structure in which the base 16 is located between the reflection hindering layers 21, 24 on the opposite sides in the outer-inner direction. In the emblem 15, the outer surface 25 and the inner surface 26 of the reflection hindering layer 24 on the inner side of the base 16 and the outer surface 22 and the inner surface 23 of the reflection hindering layer 21 on the outer side of the base 16 serve as interfaces. The outer surface 25 of the inner reflection hindering layer 24 corresponds to the interface with the inner surface 18 of the base 16, and the inner surface 26 of the reflection hindering layer 24 corresponds to the interface with air. The inner surface 23 of the outer reflection hindering layer 21 corresponds to the interface with the outer surface 17 of the base 16, and the outer surface 22 of the reflection hindering layer 21 corresponds to the interface with air. The outer surface 22 corresponds to the interface of the reflection hindering layer 21 on the front side in the millimeter wave travel direction. The outer surface 25 corresponds to the interface of the reflection hindering layer 24 on the front side in the millimeter wave travel direction. The inner surface 23 corresponds to the interface of the reflection hindering layer 21 on the rear side in the millimeter wave travel direction. The inner surface 26 corresponds to the interface of the reflection hindering layer 24 on the rear side in the millimeter wave travel direction.

Figure 3:
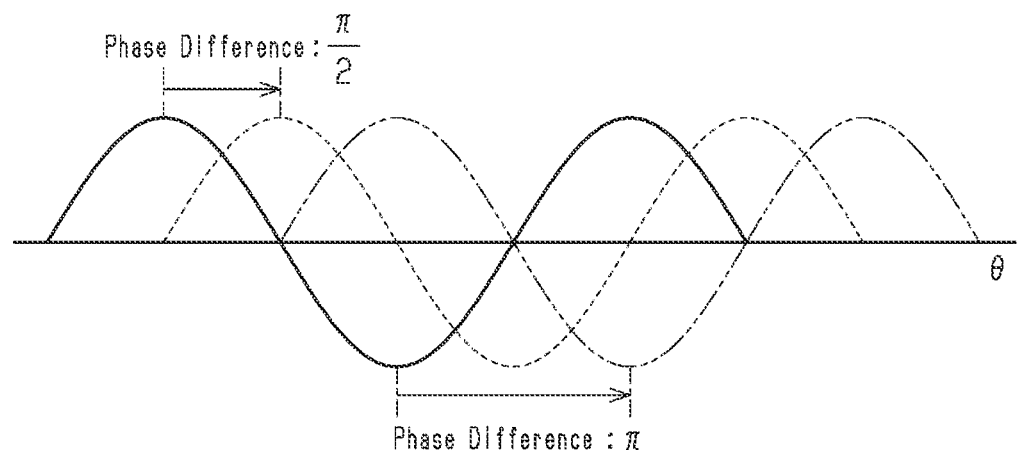
FIG. 3 is a waveform graph illustrating the phase difference between reflected waves in the embodiment.

Some of the incident waves are inwardly reflected on the inner surface 26 and the outer surface 25 of the inner reflection hindering layer 24. At this time, as shown in FIG. 3, phase deviation (phase difference) occurs between the millimeter waves (reflected waves) reflected on the outer surface 25 of the reflection hindering layer 24 and the millimeter waves (reflected waves) reflected on the inner surface 26 of the reflection hindering layer 24.

Further, part of the incident waves are inwardly reflected on the inner surface 23 and the outer surface 22 of the outer reflection hindering layer 21. At this time, as shown in FIG. 3, phase deviation (phase difference) occurs between the millimeter waves (reflected waves) reflected on the outer surface 22 of the reflection hindering layer 21 and the millimeter waves (reflected waves) reflected on the inner surface 23 of the reflection hindering layer 21.

Figure 7:
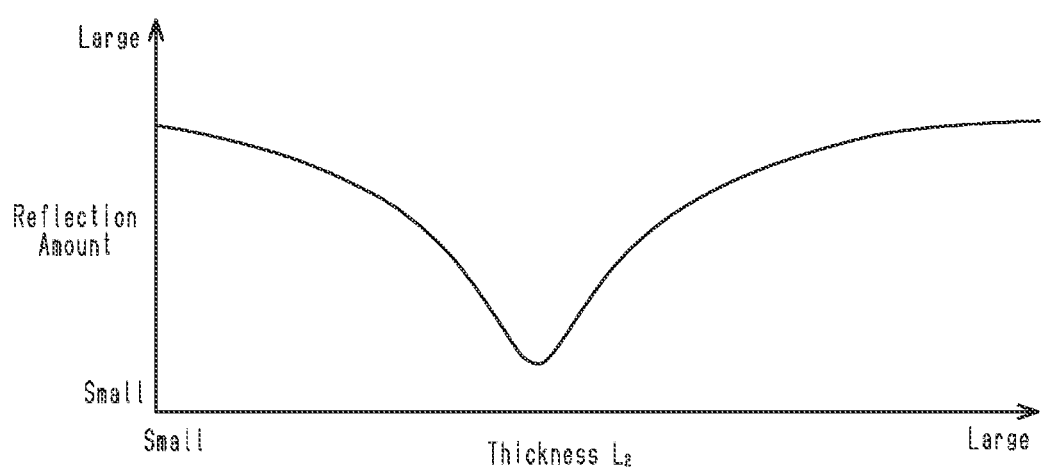
FIG. 7 is a graph showing the relationship between the thickness of each of the reflection hindering layers and the reflection amount of the millimeter wave.

Thickness $L_2$ satisfies the above-described Equation 6 both on the inner reflection hindering layer 24 and the outer reflection hindering layer 21. Thus, in the reflection hindering layer 24, the phase of the reflected wave on the outer surface 25 and the phase of the reflected wave on the inner surface 26 are deviated from each other by n and the reflected wave on the outer surface 25 and the reflected wave on the inner surface 26 are in antiphase. Likewise, in the reflection hindering layer 21, the phase of the reflected wave on the outer surface 22 and the phase of the reflected wave on the inner surface 23 are deviated from each other by in and the reflected wave on the outer surface 22 and the reflected wave on the inner surface 23 are in antiphase. Accordingly, both on the inner reflection hindering layer 24 and the outer reflection hindering layer 21, the reflected wave reflected on the inner surfaces 26, 23 (shown by the solid line in FIG. 3) and the reflected wave reflected on the outer surfaces 25, 22 (shown by the broken line in FIG. 3) offset each other. In other words, the phases are cancelled. FIG. 7 shows the relationship between thickness $L_2$ of the reflection hindering layers 21, 24 and the reflection amount of the millimeter wave. As shown in FIG. 7, the reflection amount becomes smaller when the value obtained using Equation 6 is set as thickness $L_2$ than when another value is set. This increases the amount of millimeter waves that pass through the emblem 15 and increases a passage coefficient T (the maximum value is 1).

In this manner, a suitable thickness $L_2$ of the reflection hindering layers 21, 24 is set for the base 16 having any thickness $L_1$ and relative permittivity $\varepsilon_\alpha$. This cancels and reduces the reflection.

One example of the emblem 15 that satisfies the above-described Equations 1 to 5 is as follows. In this example, the base 16 is made of acrylonitrile-styrene-acrylate (ASA) copolymer plastic, and the reflection hindering layers 21, 24 are made of polycarbonate (PC) plastic. Thickness $L_1$ of the base 16 is 3 mm. In this thickness $L_1$, the reflection coefficient R of the base 16 is so high that a large amount of millimeter waves is reflected on the outer surface 17 and the inner surface 18. The frequency of the millimeter wave is 76.5 |GHz|. The relative permittivity $\varepsilon_\alpha$ of the ASA plastic is 2.70. The relative permittivity $\varepsilon_\beta$ of the PC plastic is 2.78. The variable "n" is an integer. The phase deviation amount $\beta$ is approximately $0.927585+n\pi$ or approximately $-1.01323+n\pi$. When the phase deviation amount $\beta$ is $0.927585+n\pi$, thickness $L_2$ is approximately $0.280+1.175n$ [mm]. When the phase deviation amount $\beta$ is $-1.01323+n\pi$, thickness $L_2$ is approximately $-0.296+1.175n$ [mm]. Thus, when thickness $L_2$ of the reflection hindering layer 21 is the half of the wavelength of 0.280 [mm] or the half of the wavelength of 0.880 [mm], the reflection hindering layer 21 produces an operation in which the reflection coefficient R is 0 like an anti-reflective film. When thickness $L_2$ of the reflection hindering layer 24 is the half of the wavelength of 0.280 [mm] or the half of the wavelength of 0.880 [mm], the reflection hindering layer 24 produces an operation in which the reflection coefficient R is 0 like an anti-reflective film.

Such an operation hinders the amount of millimeter waves passing through the emblem 15 from being decreased due to the reflection of the millimeter waves on the inner surface 18 and the outer surface 17 of the base 16. The detection function of the millimeter wave radar device 13 is improved by increasing the ratio of the amount of millimeter waves returning to the millimeter wave radar device 13 to the amount of millimeter waves transmitted from the millimeter wave radar device 13.

The above-described embodiment may be modified as follows. The above-described present embodiment and the following modifications can be combined as long as the combined modifications remain technically consistent with each other.

One of the reflection hindering layers 21, 24 may be omitted. Even in this case, when thickness $L_2$ is set to $\beta/\beta_2$, the reflection of millimeter waves is hindered so as to improve the transmissiveness to electromagnetic waves in the same manner as the above-described embodiment.

On the rear surface of the two surfaces of the base 16 in the millimeter wave travel direction, the reflection hindering layer 24 may be arranged only in a region irradiated with millimeter waves.

The above-described electromagnetic wave transmissive cover is applicable as long as the electromagnetic wave transmissive cover is incorporated in a vehicle including a radar device transmitting and receiving electromagnetic waves used to detect an object outside the vehicle. In this case, examples of the electromagnetic waves transmitted and received by the radar device include electromagnetic waves such as infrared lights, in addition to millimeter waves.

The radar device that transmits and receives electromagnetic waves used to detect an object outside the vehicle does not have to be a front-monitoring radar device. Instead, this radar device may be a rear-monitoring radar device, a side-monitoring radar device for the front part, or a side-monitoring radar device for the rear part. In this case, the electromagnetic wave transmissive cover is arranged in front of the radar device in the transmission direction of electromagnetic waves.

The electromagnetic wave transmissive cover is applicable not only to an emblem but also to, for example, an ornament or a mark.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electromagnetic wave transmissive cover, comprising:
   a base configured to be arranged in a path of electromagnetic waves in a radar device that transmits and receives the electromagnetic waves, the base being made of a dielectric material and having transmissiveness to the electromagnetic waves, and
   a reflection hindering layer laminated on at least one of two surfaces of the base in a travel direction of the electromagnetic waves, the reflection hindering layer being made of a dielectric material, the reflection hindering layer having transmissiveness to the electromagnetic waves and hindering reflection of the electromagnetic waves, wherein
  a wavelength of each of the electromagnetic waves in the reflection hindering layer is referred to as $\lambda 2$ and $2\pi/\lambda 2$ is set as a phase constant $\beta_2$,
  an amount of deviation between a phase of a reflected wave reflected on an interface on a front side of the reflection hindering layer in the travel direction and a phase of a reflected wave reflected on an interface on a rear side of the reflection hindering layer in the travel direction is referred to as a phase deviation amount $\beta$, and
  thickness $L_2$ of the reflection hindering layer is set to $\beta/\beta_2$.

2. The electromagnetic wave transmissive cover according to claim 1, wherein the reflection hindering layer is arranged on a rear surface of the two surfaces of the base in the travel direction, the reflection hindering layer being arranged at least in a region of the rear surface of the base irradiated with the electromagnetic waves.

3. The electromagnetic wave transmissive cover according to claim 1, wherein
  a wavelength of each of the electromagnetic waves in the base is referred to as $\lambda 1$ and $2\pi/\lambda 1$ is set as a phase constant $\beta_1$,
  an amount of deviation between a phase of a reflected wave reflected on an interface on a front side of the base in the travel direction and a phase of a reflected wave reflected on an interface on a rear side of the base in the travel direction is referred to as a phase deviation amount $\alpha$,
  a thickness of the base is referred to as $L_1$,
  a relative permittivity of the base is referred to as $\varepsilon_\alpha$,
  a relative permittivity of the reflection hindering layer is referred to as $\varepsilon_\beta$, and
  the phase deviation amount $\beta$ is set using the following Equations 1 to 5:

$$\alpha = \beta_1 L_1; \quad \text{Equation 1}$$

$$\beta = \tan^{-1} \frac{-A \pm \sqrt{A^2 - 4BC}}{2C} + n\pi = \beta_2 L_2; \quad \text{Equation 2}$$

$$A = 2\left(\frac{1}{\sqrt{\varepsilon_\beta}} - \sqrt{\varepsilon_\beta}\right)\cos\alpha; \quad \text{Equation 3}$$

$$B = \left(\frac{1}{\sqrt{\varepsilon_\alpha}} - \sqrt{\varepsilon_\alpha}\right)\sin\alpha; \text{ and} \quad \text{Equation 4}$$

$$C = \left(\frac{\varepsilon_\beta}{\sqrt{\varepsilon_\alpha}} - \frac{\sqrt{\varepsilon_\alpha}}{\varepsilon_\beta}\right)\sin\alpha. \quad \text{Equation 5}$$

* * * * *